United States Patent [19]

Ichikawa

[11] 4,207,912
[45] Jun. 17, 1980

[54] EMERGENCY SHUT-OFF VALVE

[76] Inventor: Kiyotada Ichikawa, 5-chome, 21 Edogawa, Edogawa-ku, Tokyo 132, Japan

[21] Appl. No.: 921,704

[22] Filed: Jul. 3, 1978

[51] Int. Cl.² .......................................... F16K 17/36
[52] U.S. Cl. .................................. 137/39; 137/78 R; 251/65
[58] Field of Search ................ 137/38, 39, 78; 251/65

[56] References Cited

U.S. PATENT DOCUMENTS

| 2,508,588 | 5/1950 | Waltman | 137/78 |
|---|---|---|---|
| 3,783,887 | 1/1974 | Shoji | 137/38 |
| 4,018,419 | 4/1977 | Monpetit | 251/65 |
| 4,116,209 | 9/1978 | Greer | 137/38 |

Primary Examiner—Robert G. Nilson
Attorney, Agent, or Firm—George B. Oujevolk

[57] ABSTRACT

An emergency shut-off valve adaptable in a gas supply pipe to shut off the pipe in the time of emergency such as occurrence of an abnormal vibration or gas leak, comprising a hollow body which is open at its top and covered by a cover member, said cover member having secured to its inside central part an iron core around which is wound a coil connected to an external gas leak detector and adapted to magnetize said iron core upon receiving an electric signal from said detector, an actuator provided in said hollow body and having secured to its top face a permanent magnet whereby said actuator is magnetically attached to said iron core, said permanent magnet being arranged such that its upper side has the same polarity as that which appears at the underside of said iron core when it is magnetized so that said actuator will drop because of repulsion therebetween when said iron core is magnetized, said hollow body also having formed in its side wall a gas feed hole and discharge holes, a push-up lever adapted to raise up said actuator from its dropped position to its uppermost position where it is magnetically attached to said iron core, a magnetic induction element provided to said cover member for induction of magnetic pole appearing at the underside of said iron core when it is magnetized, and a pendant such as a chain suspended from an upper part on the external wall of said hollow body to determine verticality of said hollow body.

5 Claims, 9 Drawing Figures

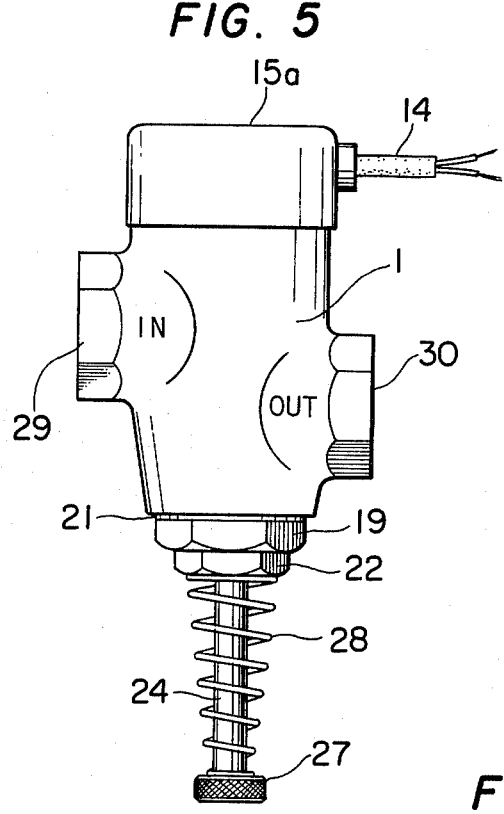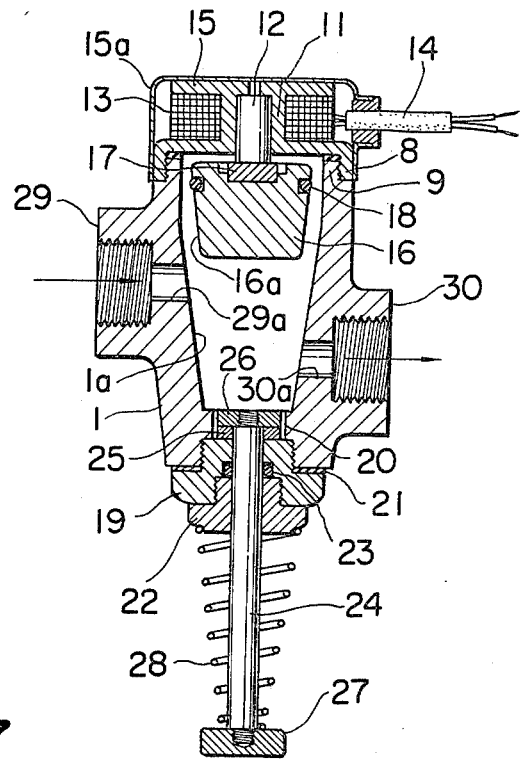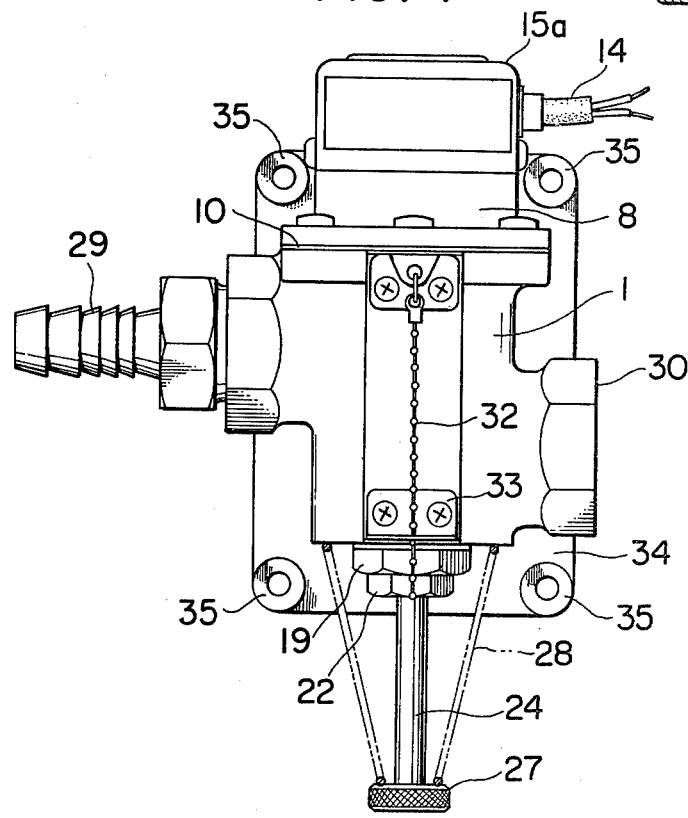

EMERGENCY SHUT-OFF VALVE

This invention relates to an emergency shut-off valve which is operable to immediately close the gas supply pipe in an emergency such as occurence of an abnormal vibration or gas leak. The valve of this invention shuts off supply of gas in the event an earthquake of a magnitude above a certain predetermined level should occur during use of gas in the general households to eliminate the risk of fire. The valve is also operated to shut off gas supply upon receiving an electric signal from a separately provided gas leak detector when the latter has detected a gas leak cause by a break in the gas supply pipe leading to gas fixtures, accidental go-out of the gas flame by wind blow or for other reasons, preclude any danger of accidents such as gas poisoning or explosion.

The invention is described in detail hereinbelow by way of some preferred embodiments thereof with reference to the accompanying drawings, in which:

FIG. 5 is a general external front view of an emergency shut-off valve according to another embodiment of this invention;

FIG. 6 is a sectional view showing the inside mechanism of the valve of FIG. 5;

FIG. 7 is a general external front view of an emergency shut-off valve according to still another embodiment of this invention;

Figure 1:
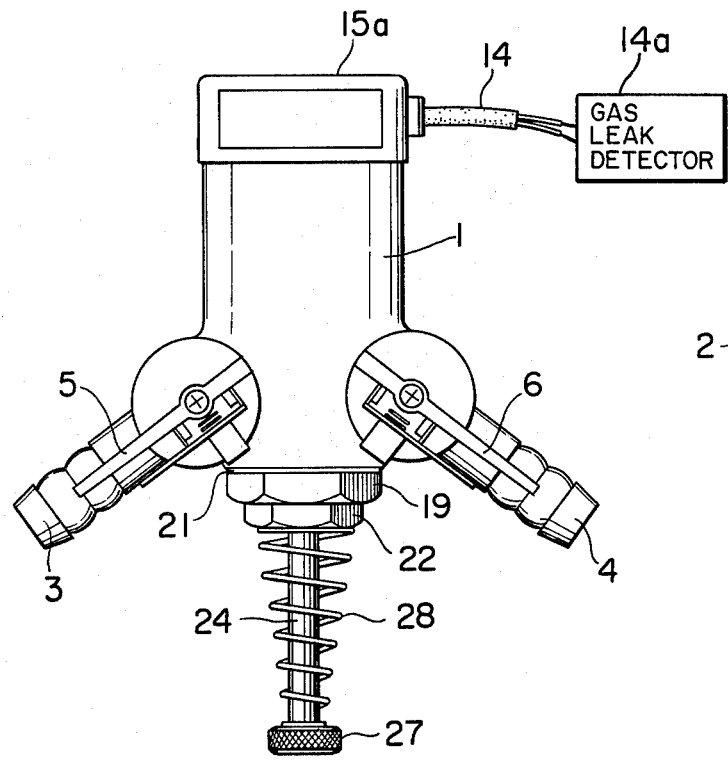
FIG. 1 is a general external front view of an emergency shut-off valve according to one embodiment of this invention.
Figure 2:
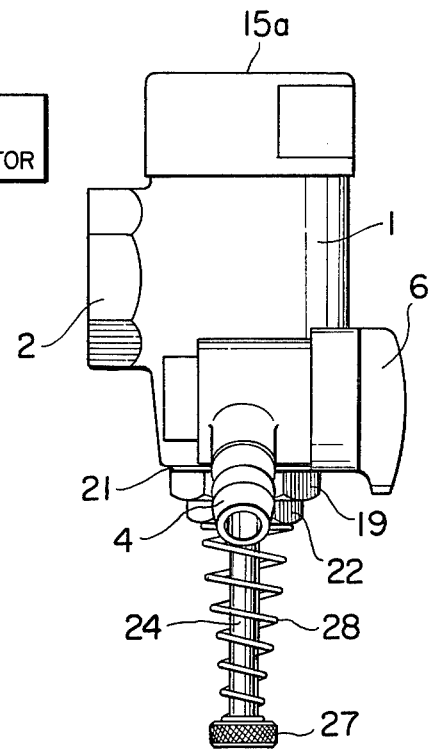
FIG. 2 is a side view thereof.
Figure 3:
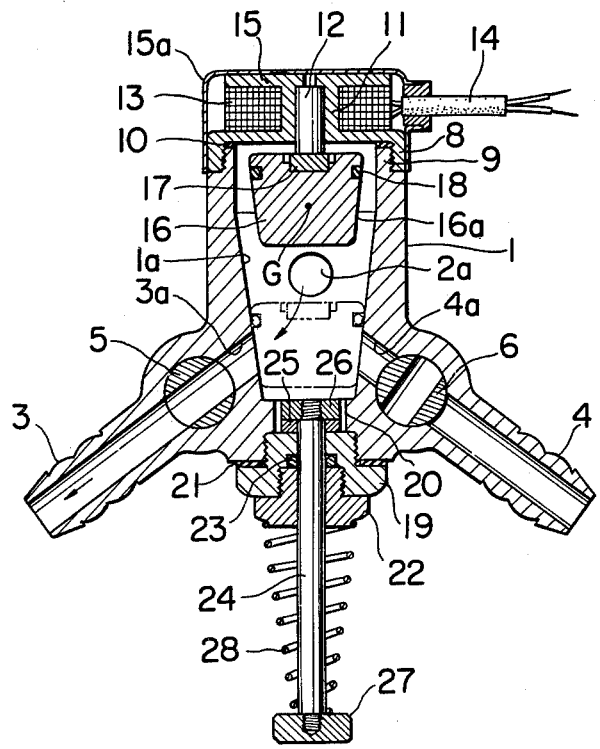
FIG. 3 is a sectional view showing the inside mechanism of the valve of FIG. 1.
Figure 4:
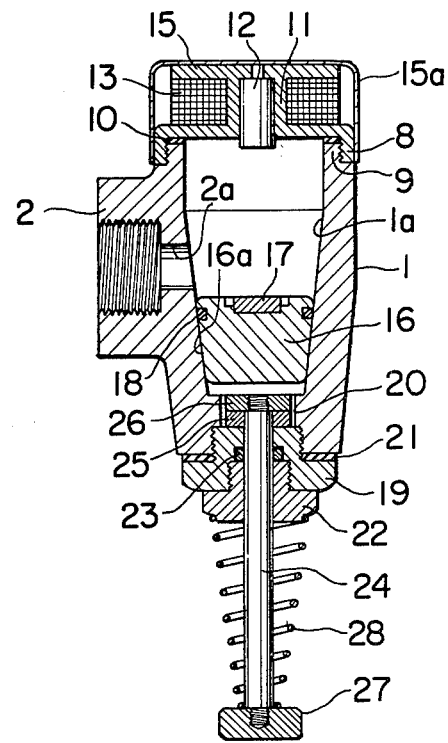
FIG. 4 is a sectional view of FIG. 2.

Referring first to FIGS. 1 to 4 which illustrate a first embodiment of this invention, numeral 1 indicates the hollow body portion of an emergency shut-off valve in accordance with this invention. Said body portion 1 is open at its top and has the inner peripheral wall 1a which tapers down toward the bottom portion thereof. It is so designed that it can be screwed into a pipe end substantially vertically thereto and fixed therein. It will be seen that a gas supply pipe 2 is connected to said body portion 1 at a position in its external side wall located substantially centrally on one side thereof, while discharge pipes 3 and 4 are provided at the positions located close to the bottom portion on the other side. In the inner peripheral wall 1a are formed a gas supply hole 2a and discharge holes 3a and 4a corresponding to said respective gas supply and discharge pipes. Gas cocks 5, 6 are adapted in said discharge pipes 3, 4, respectively. The open top of the body portion 1 is airtightly closed by a cover 8 which is made of a non-magnetic material and threadedly fitted on an external thread 9 provided at the top end of the external side wall of the body portion 1. A packing 10 is disposed between the body portion 1 and the cover 8. An integrally formed iron core support cylinder 11 projects outwardly from the central portion of the cover 8, and an iron core 12 is fitted therein such that the lower end thereof will project out slightly into the body portion 1. Such iron core is secured in position by an adhesive or other means. Wound around said iron core support cylinder 11 is a coil 13 adapted for magnetizing said iron core 12 and connected by a lead wire 14 to a gas leak detector 14a provided separately from the valve body. Said coil 13 is capped by a cover 15 formed integrally at the top end of the iron core support cylinder 11. Numeral 15a denotes a protective cover and 16 an actuator provided in the body portion 1 such that it is able to drop to the bottom of the body portion 1 from an upper position thereof. The outer peripheral wall surface 16a of said actuator 16 is tapered downwardly so that the diameter thereof is largest at its upper end and decreased steadily toward its lower end. A permanent magnet 17 is fitted in a recession provided in the top surface of said actuator 16, said magnet 17 being securely fixed in position by an adhesive or other means. Also, a ring-shaped packing 18 is fitted and secured in an annular groove provided at an upper part of the outer peripheral wall surface 16a. Said actuator 16 is magnetically attached, by means of its permanent magnet 17, to the lower end of the iron core 12 such that it can easily fall down. The permanent magnet 17 is so arranged that its upper side has same polarity as that which appears at the lower end of the iron core 12 when the latter is magnetized. That portion of the inner peripheral wall surface 1a of the valve body 1 which is positioned closer to the bottom of the valve body is tapered correspondingly to the taper of the outer peripheral wall surface 16a of the actuator 16.

Numeral 19 refers to a fastening means screwed into the bottom portion of the valve body 1 so as to close a hole 20 formed in said bottom portion, with a packing 21 being disposed between said fastening means 19 and the valve body 1. Another fastening means 22 is screwed into a threaded hole provided centrally of the first-said fastening means 19, with a packing 23 being interposed between said both fastening means 19 and 22. A push-up lever 24 is slidably inserted into the valve body 1 through the holes provided centrally in said both fastening means 19 and 22. At the inserting end of said push-up lever 24 is secured a push-up plate 26 through a packing 25, and a manual push button 27 is secured to the other end of said push-up lever which projects outside of the valve body 1. A spring 28 is coiled around said push-up lever 24 and disposed between said fastening means 22 and manual push-button 27, said spring 28 being adapted to keep said push-up lever 24 normally forced down by its elastic force.

FIGS. 5 and 6 show an example of emergency shut-off valve according to this invention as it was adapted halfway on a pipe line. The mechanism of this device is same as that of the above-described embodiment except that a gas inlet pipe 29 is provided at a central position on one side of the valve body while a gas outlet pipe 30 is provided at a position close to the bottom of the valve body on the other side, and that a gas inlet hole 29a and outlet hole 30a open in the inner peripheral wall 1a of the hollow valve body 1.

Figure 8:
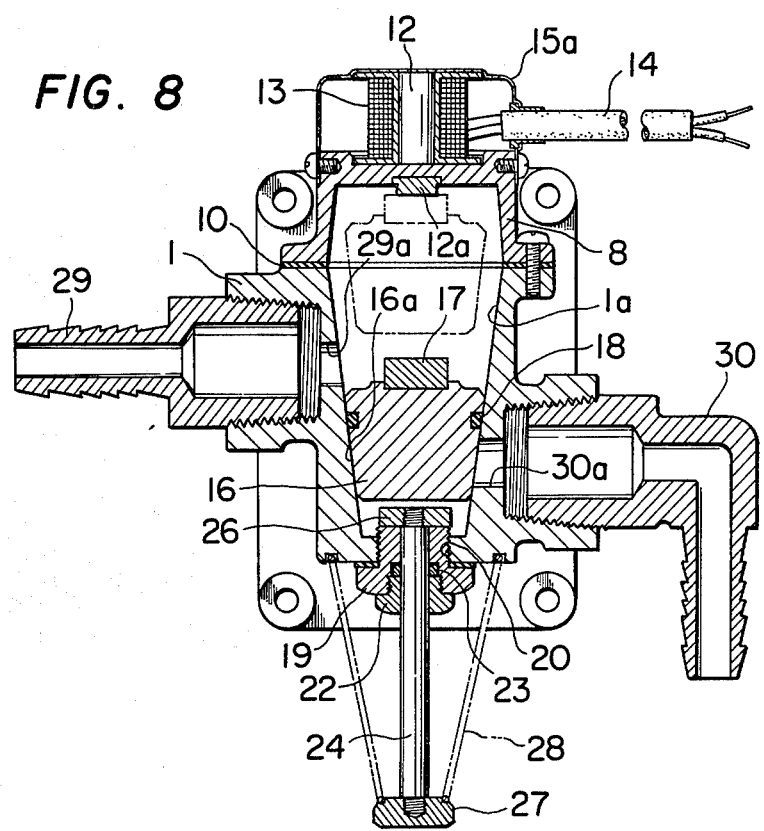
FIG. 8 is a sectional view showing the inside mechanism of the valve of FIG. 7.
Figure 9:
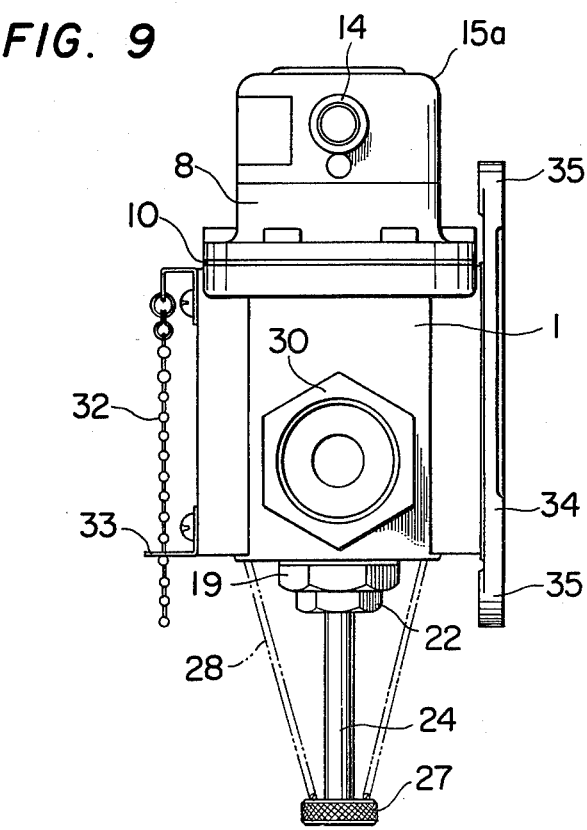
FIG. 9 is a side view thereof.

Referring now to FIGS. 7 to 9, there is shown still another embodiment of emergency shut-off valve according to this invention featuring separate shutdown of the electric system and the gas system to ensure greater safety. In this embodiment, an iron core 12 and a coil 13 for magnetizing it are provided centrally in the upper part of the cover 8 adapted to airtightly close the external opening of the hollow valve body portion 1, and a magnetic induction element 12a is provided centrally in the inside of the cover 8, said element 12a being adapted to induce the magnetic pole that appears at the lower end of the iron core 12 when said iron core is magnetized. This embodiment is otherwise same as the preceding embodiments in mechanical arrangement.

As seen in FIGS. 7 to 9, a fixture 31 is provided at an upper part on the external side of the hollow body 1 and a chain 32 is suspended therefrom, said chain 32 being adapted to serve as a measure to determine whether the hollow body 1 is fixed correctly in the vertical direction. 33 is a verticality determination plate having a hole through which the lower portion of said chain 32 passes. If the chain 32 extends just through the center of said hole, then the hollow body 1 is positioned just vertically. 34 is an adaptor plate formed integrally on the external surface of the hollow body 1 on the side opposite from the portion where the chain 32 is suspended. This adaptor plate is attached to a room wall or such and secured thereto by means of screws driven into said wall through the holes 35 formed at four corners of said adaptor plate.

In operation of the emergency shut-off valve of this invention shown and described hereinabove, when an abnormal vibration such as an earthquake with an acceleration of a greater than predetermined level is transmitted to the valve, the actuor 16 therein is correspondingly shaken, and when its gravity gets the better of the magnetic attraction of the permanent magnet 17 to the iron core 12, said actuator 16 drops toward the bottom of the body 1 and the tapered external wall surface 16a of said actuator 16 closely fits with the correspondingly tapered inner wall surface of the body 1 to close the gas discharge holes 3a and 4a or gas outlet hole 30a while, at the same time, gas is forced into the hollow body 1 from the gas supply hole 2a or inlet hole 29a to press the actuator 16, whereby gas supply is shut off to preclude the danger of causing accident such as fire.

When the gas leak detector detects a gas leak, an electric signal is sent therefrom to the coil 13 through the lead wire 14 to magnetize the iron core 12, whereupon the permanent magnet 17 magnetically attached to the underside of said iron core 12 is given repulsion because of same polarity to let the actuator 16 drop to shut off gas supply in the same way as in the above-said case of abnormal vibration.

When the abnormal vibration such as earthquake died down or when the abnormal situation such as gas leak was removed to restore the normal condition, the manual button 27 is pressed to raise up the push-up lever 24, whereby the actuator 16 is raised up by the push-up plate 26 so that the permanent magnet 17 secured to the top face of said actuator is again magnetically attached to the underside of the iron core 12, thus setting the actuator 16 at its normal magnetically fixed position. If the depression on the manual button 27 is released, the push-up lever 24 returns to its original position under the elastic force of the spring 28. During this operation, airtightness of the hollow body portion 1 is maintained by the packings 25, 21, 23 and fastening means 19, 22, so that there is no fear of causing a gas leak in this operation.

This invention has the following salient characteristic features. The actuator 16 magnetically attached to the lower end face of the iron core 12 constitutes an approximate forced pendulum with a high natural oscillation frequency, the center of the pendulum being the magnetically attached face and the length of the pendulum being the distance between said magnetically attached face and the center of gravity G of the actuator 16 and permanent magnet 17 combined together. According to this oscillation system, the actuator 16 swings substantially proportionally to the acceleration of the abnormal vibration such as an earthquake. Therefore, the actuator 16 has the characteristic to fall down when exposed to a vibration such as an earthquake having always a substantially constant acceleration, regardless of the type of vibration or the period of vibration. Thus, there is provided a high-precision emergency shut-off valve which is operated as the actuator 16 drops when the acceleration of a vibration such as an earthquake reaches the point of action which is determined by the magnetic force of the permanent magnet 17 and the area of the magnetically attached face of the iron core 12. Also, when an electric signal is given from an outside unit such as a gas leak detector to the coil 13 wound around the iron core 12, said iron core 12 is magnetized to become an electromagnet, and as arrangement is made such that the contacting faces of said both iron core 12 and permanent magnet 17 will assume the same magnetic polarity, they repel each other to let the actuator 16 drop immediately. Further, once the actuator 16 drops, it keeps the gas discharge holes or outlet hole closed unless the push-up lever is raised up, so that even if the gas stop valve of a gas fixture is kept open in the event of occurence of an abnormal vibration such as an earthquake, there is no danger of immediately causing a gas leak. Also, since the valve of this invention is operated immediately upon receiving an electric signal from a gas leak detector or other like unit, the electric power consumption for such operation is very slight, and even if the power should give out after the valve operation, the valve can positively keep the gas shut off. Moreover, in case the normal condition is restored after the valve operation upon occurence of a strong vibration such as an earthquake or other abnormal situation such as a gas leak, should a gas leak occur due to the open valve in a terminal gas fixture, such gas leak is detected by the gas leak detector to immediately shut off gas supply again, thus assuring prevention of a secondary accident.

As described above, this invention can provide a high-precision emergency shut-off valve which is extremely simple in mechanism and easy to operate.

What is claimed is:

1. An emergency shut-off valve comprising a hollow body which is open at its top end and covered by a cover member, said cover member having secured to its inside central portion an iron core, said iron core having wound therearound a coil connected to a separately provided gas leak detector from which an electric signal is transmitted to said coil to magnetize said iron core, said hollow body having provided therein an actuator having secured to its top face a permanent magnet which is so arranged that its upper side has the same polarity as that which appears at the underside of said iron core when it is magnetized and whereby said actuator is magnetically attached to the underside of said iron core so that said actuator is able to fall down, said hollow body also having formed in its side wall a gas supply hole and at least one gas discharge hole which is closed by said actuator when it drops, and, a push-up lever provided at the bottom of the hollow body, said push-up lever being adapted to raise up the actuator from its dropped position to its uppermost position where it is magnetically attached to the iron core.

2. An emergency shut-off valve according to claim 1, wherein the outer peripheral wall of the actuator is tapered such that the diameter thereof is largest at its top end and decreased gradually toward its lower end, and that portion of the inner peripheral wall of the hollow body which corresponds to the dropped position of the actuator is tapered in conformity to the tapered wall of said actuator, and a gas discharge hole or holes are opened in this tapered wall portion.

3. An emergency shut-off valve according to claim 1, wherein the iron core is secured to an outside central part of the cover closing the top opening of the hollow body, and a magnetic induction element adapted for inducing the magnetism to said iron core is secured to an inside central part of said cover.

4. An emergency shut-off valve according to claim 3, wherein a pendant such as a chain is suspended from an upper part on the external wall of the hollow body.

5. An emergency shut-off valve, comprising in combination:
   (a) an upright elongated substantially straight hollow valve body chamber having a tapered lower end with gas inlet means and gas outlet means towards the lower end of said tapered lower end, said valve body being so designed as to be disposed vertically when connected in a flow system;
   (b) a sealing cover over said hollow body chamber having a centrally located iron core held therein, a coil around said iron core, said core and coil forming an electromagnet and lead lines extending out of said cover from said coil for connection to a gas leak detector;
   (c) a valve actuator with a top and bottom within said hollow body having a downwardly tapered outer wall towards said bottom, said taper corresponding in configuration to said tapered lower end so that when said actuator bottom enters said lower end, said actuator tapered outer wall will seal off said gas outlet means, also a permanent magnet at said actuator top disposed to engage said core; and,
   (d) lever means disposed for reciprocating movement extending outwards from said lower end with bias means connected to said lever means, whereby when a severe earthquake shakes the valve, the actuator will drop and seal off the outlet means from the gas inlet means, or, when a gas leak detector sends a signal through said lead lines, said coil will form an electromagnet in said core of a polarity to repel said permanent magnet causing said actuator to drop and seal off said outlet means, said lever means serving to restore said actuator to its original position, said bias means then restoring said lever means.

* * * * *

UNITED STATES PATENT AND TRADEMARK OFFICE
CERTIFICATE OF CORRECTION

PATENT NO. : 4,207,912
DATED : June 17, 1980
INVENTOR(S) : Kiyotada Ichikawa

It is certified that error appears in the above—identified patent and that said Letters Patent is hereby corrected as shown below:

On the Title Page insert:

-- (73) Assignee: Shimoda Electric Co. Ltd. Tokyo, Japan, and Sanwa Industrial Co., Ltd., Tokyo, Japan --.

Signed and Sealed this

Seventeenth Day of February 1981

[SEAL]

Attest:

RENE D. TEGTMEYER

Attesting Officer

Acting Commissioner of Patents and Trademarks